May 8, 1945. W. H. BASELT ET AL 2,375,206
CAR TRUCK
Filed April 30, 1942 2 Sheets-Sheet 1
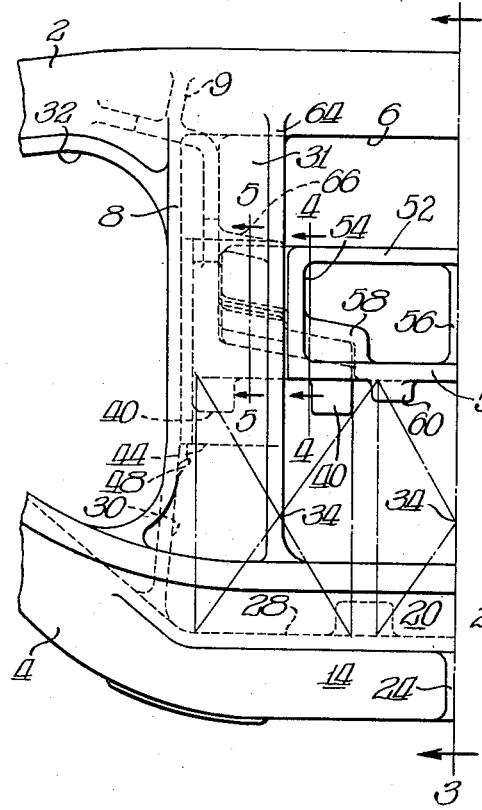
Fig.1.
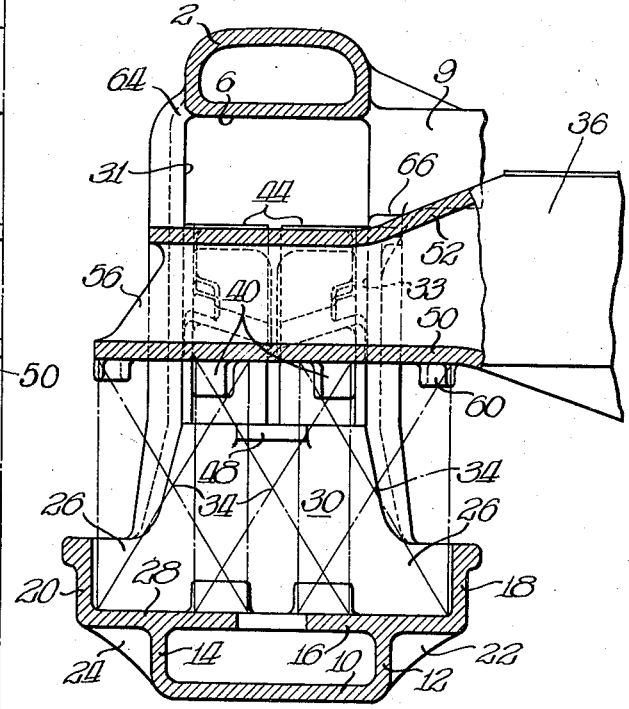
Fig.3.
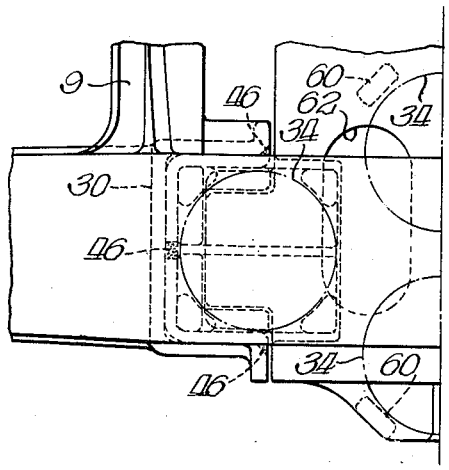
Fig.2.
Fig.4.
Fig.5.
INVENTORS:
Walter H. Baselt
John E. Flesch
BY
ATTORNEY May 8, 1945. W. H. BASELT ET AL 2,375,206
CAR TRUCK
Filed April 30, 1942 2 Sheets-Sheet 2
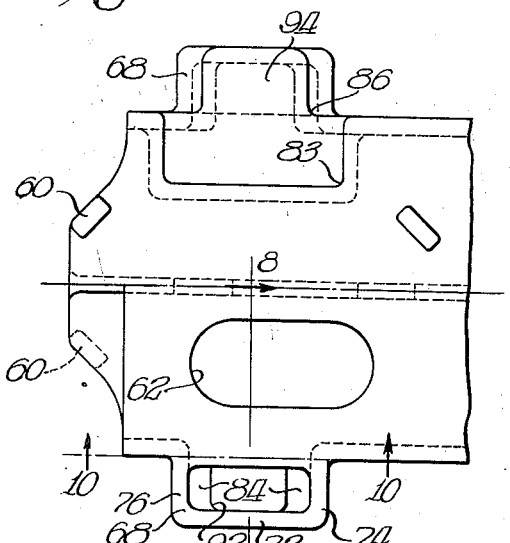
Fig.6.
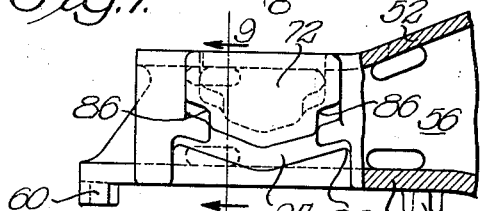
Fig.7.
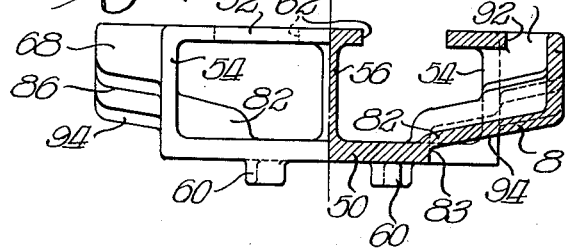
Fig.8.
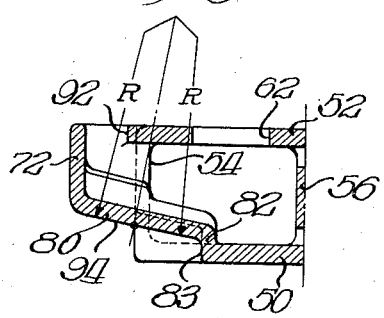
Fig.9.
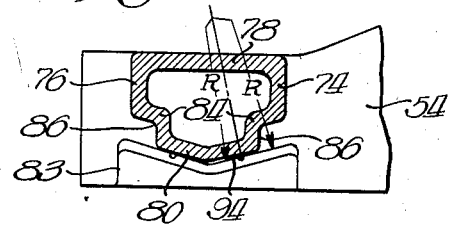
Fig.10.
Fig.11.
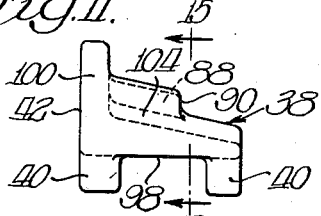
Fig.12.
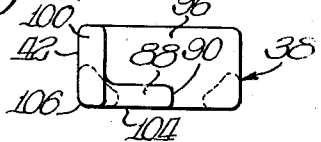
Fig.13.
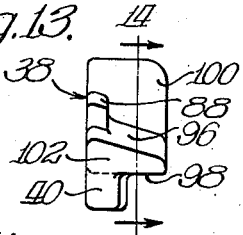
Fig.14.
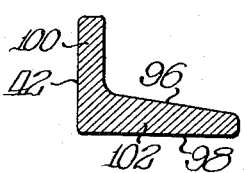
Fig.15.
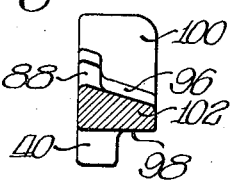
INVENTORS:
Walter H. Baselt
John E. Flesch
BY
ATTORNEY Patented May 8, 1945

2,375,206

UNITED STATES PATENT OFFICE 2,375,206

CAR TRUCK

Walter H. Baselt, Tucson, Ariz., and John E. Flesch, Chicago, Ill., assignors to American Steel Foundries, Chicago, Ill., a corporation of New Jersey Application April 30, 1942, Serial No. 441,072

17 Claims. (Cl. 105—197)

Our invention relates to railway freight car trucks and especially to a novel form of freight car truck incorporating a quick wheel change feature.

The general object of our invention is to devise a relatively simple form of four wheel truck of quick wheel change type wherein long travel springs may be utilized or if desirable shorter springs of standard length, and wherein the construction of the parts will be such as to facilitate standard foundry practice.

A specific object of our invention is to devise a novel form of interlocking arrangement between a side frame and bolster wherein the bolster may have guiding engagement with each side frame column along relatively wide spaced areas affording effective squaring relationship of said bolster with respect to said side frame.

Yet another object of our invention is to devise such a truck arrangement as that described wherein each side frame column for the larger portion of its length may have a U-section between the inboard and outboard walls of which a bolster supporting spring group may conveniently be partially housed, said bolster supporting spring affording support for friction shoes which may engage the walls of the column and be actuated by a bolster.

Our novel arrangement comprehends a side frame structure wherein a portion of the inboard wall may be cut away adjacent the top of the bolster opening to afford access for a wing portion on the bolster, said wing portion, when the parts are in normal assembled relationship, being seated upon friction shoes supported on the before-mentioned spring and in engagement with the adjacent column.

In our arrangement a pair of friction shoes may be supported in each column for both lateral and longitudinal abutment thereagainst, and the engagement of the shoes with the bolster wing may be tapered in two directions in order effectively to urge the shoes into the corners of the columns for frictional engagement with the walls thereof.

Our construction also contemplates such a bearing between each friction shoe and the adjacent bolster wing as will permit the friction shoe properly to align itself with a plurality of friction surfaces on the adjacent column.

Our invention comprehends a novel form of bolster end structure as is described hereinafter in detail, as well as a novel form of side frame for association therewith.

In the drawings,

Figure 1 is a fragmentary side elevation of a railway freight car truck embodying our invention, only one end of the truck being shown inasmuch as the structure is similar at opposite ends thereof.

Figure 2 is a fragmentary top plan view of the truck shown in Figure 1.

Figure 3 is a fragmentary sectional view taken substantially in the vertical plane bisecting the truck transversely and as indicated by the line 3—3 of Figure 1.

Figure 4 is a fragmentary sectional view taken substantially in the transverse vertical plane indicated by the line 4—4 of Figure 1, and Figure 5 is a further fragmentary sectional view taken in the transverse vertical plane indicated by the line 5—5 of Figure 1.

Figures 6 to 10 inclusive show the end structure of our novel bolster, Figure 6 being a plan view, the lower half thereof showing the top plan and the upper half thereof the bottom plan; Figure 7 being a side elevation partly in section; Figure 8 an end view half in section, the section being taken substantially in the transverse plane indicated by the line 8—8 of Figure 6; Figure 9 being a further transverse sectional view taken approximately in the vertical plane indicated by the line 9—9 of Figure 7; and Figure 10 being a sectional view taken in the vertical longitudinal plane indicated by the line 10—10 of Figure 6.

Figures 11 to 15 inclusive show the detail of my novel form of friction shoe, Figure 11 being a side elevation thereof, Figure 12 a top plan view, Figure 13 an end elevation taken from the bolster engaging face thereof, Figure 14 being a sectional view taken substantially in the plane indicated by the line 14—14 of Figure 13 and Figure 15 being a sectional view taken substantially in the plane indicated by the line 15—15 of Figure 11.

Describing in detail our novel truck arrangement, the side frame may be of well known truss type with the compression member 2 and the tension member 4 merging at each side of the bolster opening 6 with an integral column 8, and the usual brake hanger bracket 9 (fragmentarily shown) may be formed on the inboard face of the frame adjacent the juncture of the compression member 2 with each column. The compression member 2 may have a box-section over the bolster opening as best seen in the sectional view of Figure 3, and the tension member below said bolster opening may likewise have a box-section with the bottom chord 10, the inboard wall 12, the outboard wall 14, and the top web 16, said top web being widened and formed with upstanding inboard and outboard flanges 18 and 20 which may be reinforced by vertical ribs 22 and 24. The upstanding flanges 18 and 20 may converge adjacent each column and merge with the inboard and outboard walls thereof adjacent the lower extremities of said columns as may be noted at 26, 26 (Figure 3). The upstanding flanges 18 and 20 form with the top chord 16 a spring seat 28 which may extend longitudinally of the frame from the transverse web 30 of each column to that of the opposite column, said transverse web in each case defining one margin of a window opening 32. The outboard web of the column is indicated at 31 and the inboard web thereof at 33 (Figure 3). On the spring seat 28 may be positioned in usual manner coil springs diagrammatically indicated at 34, 34, the springs illustrated having a relatively long travel as compared with the well known form of shorter standard freight car truck springs. Supported on the springs 34, 34 may be the end of the bolster generally designated 36, two of said coils 34 being aligned transversely of the truck and the other two longitudinally thereof as may best be understood from a consideration of the plan view of Figure 2. Each of the longitudinally aligned springs 34, 34 may be partially housed within the adjacent column 8 and seated thereon by a pair of friction shoes 38, 38, each shoe having the detailed structure illustrated in Figures 11 to 15 inclusive. Each friction shoe 38 may have downwardly projecting lugs 40, 40 serving to position said shoes with respect to the supporting coil spring 34, the top of said spring being confined between the lugs of the adjacent shoes as well illustrated in the plan view of Figure 2. Each friction shoe 38 may have an end friction surface 42 (Figures 5 and 11) which may bear against the transverse wall of the adjacent wear plate 44, each wear plate having an L-section, one leg of which extends along the transverse web 30 of the column and the other leg of which extends along the adjacent inboard or outboard wall of the column, said wear plates being secured on the inner faces of the columns as by welding at 46, 46 and positioned vertically therein by abutment with the shelf or shoulder 48 as well illustrated in Figure 3.

The bolster 36 may have the usual box-section end portion with the bottom wall 50 and the top wall 52, the lateral walls 54, 54 and the central longitudinal reinforcing rib 56. At each side of the bolster 36 and adjacent the bottom edge thereof may be recessed the ends of the friction shoes 38, 38, the configuration of the bolster as seen at 58 (Figure 1) conforming to that of the friction shoes as illustrated in the detailed views of Figures 6 to 10 inclusive. Downwardly projecting spring positioning lugs 60, 60 may be formed on the bottom wall of the bolster at the extremity thereof and at the inboard side of the spring group, the position of said lugs being well illustrated in the plan view of Figure 2 and the top wall 52 of the bolster may be cored away as at 62 (Figure 2) to reduce the weight thereof.

As already indicated, each side frame column 8 is formed with a U-section, and the transverse web 30 thereof may extend substantially vertically upwardly to a point approximately even with the top of the bolster opening 6. The outboard web or wall 31 of each column 8 may likewise extend from its juncture with the flange 20 of the tension member upwardly to merge with the outboard web of the compression member as may be seen at 64. The inboard web 33 of each column however is partially cut away adjacent the top of the bolster opening as indicated at 66 (Figure 3), the top margin of said inboard web being formed along a diagonal plane as may be seen in the view of Figure 1, thus conforming to the shape of the bottom edge of the adjacent wing portion 68 of the bolster so that the bolster may be inserted at the top of the bolster opening and lowered into position after the friction shoes 38, 38 have been seated on the springs at opposite sides of the bolster opening, said bolster thus being normally seated directly on the springs at the middle of the bolster opening and indirectly on the springs at the ends of the bolster opening through the friction shoes. The character and form of the frictional engagement of the bolster with each friction shoe, which will be described in detail hereafter, is best seen in the sectional views of Figures 4 and 5 illustrating the form of frictional engagement therebetween as may be seen at 70.

The detail of the bolster end structure is shown in Figures 6 to 10 inclusive. The general box-section thereof has already been referred to including the top wall 52, the bottom wall 50, the side walls 54, 54, the center rib 56, and the wing portions 68, 68. Each wing portion 68 has a wall 72 parallel with the side walls of the bolster and spaced therefrom, said wall 72 merging at opposite sides thereof with inboard and outboard walls 74 and 76, the top wall 78, and the bottom wall 80 of said wing portion (Figure 10), said bottom wall 80 having a V-section as best seen in the sectional view of Figure 10 and running diagonally downwardly from the wall 72 to merge with the bottom wall 50 of the bolster proper as at 82 (Figure 9) inwardly of the side wall 54, the side and bottom walls of the bolster being offset from the recess or slot 83 for accommodation of the portions of the friction shoes at opposite sides thereof. Each of the side walls 74 and 76 is offset adjacent its lower edge forming the shoulders at 84, 84 (Figure 10) and thus defining recesses 86, 86 at opposite sides of each wing portion, within which may be received the tapered lugs 88, 88 formed at one edge of the adjacent friction shoes 38, 38. Thus, the inner edge 90 (Figure 11) of each lug 88 may abut the adjacent side wall 54 of the bolster and have guiding engagement with the before-mentioned recess 86. The top wall 78 of each wing portion may be cored away as at 92 for convenient foundry practice.

It will thus be seen that each wing portion 68 presents on its bottom wall a V-shape surface 94 which is relatively narrow on the bottom of said wing portion but widens in the portion thereof formed on the bottom wall of the bolster proper as may be well seen from the bottom plan view of the bolster at the top of Figure 6. The oppositely inclined faces of the V-shaped friction surface 94 may be engaged by the top friction surfaces 96, 96 of the adjacent pair of friction shoes.

The detailed form of each friction shoe is shown in Figures 11 to 15 inclusive. It will be noted that the bottom face of each friction shoe defines a spring seat 98 with spring positioning lugs 40, 40 at opposite edges thereof. On the top surface of each friction shoe is formed the friction surface 96 already referred to, said friction surface being interrupted adjacent the vertical wall 100 of said shoe by the before-mentioned lug 88. It may be noted that the friction surface 96 is tapered in two directions as may be seen from a comparison of the sectional views of Figures 14 and 15, an important feature, whereby each shoe is urged into frictional engagement not only with the transverse wall of each wear plate but with an inboard or outboard wall thereof as already described. Each friction shoe 38 has a general L-section as well illustrated in Figure 14 with the vertical wall 100 and the horizontal wall 102, and the inner face of said vertical wall 100 may bear against the outer face of the wall 72 of the adjacent wing portion.

Three distinct friction surfaces are formed on each friction shoe, two vertical, one of said vertical faces being formed on the wall 100 and already referred to as a friction surface 42, said friction surface 42 being disposed substantially at right angles to the vertical friction surface 104 and merging therewith along the smooth radius indicated at 106 (Figure 12) so that the surfaces 42 and 104 may bear against the respective webs of the adjacent wear plate 44. Thus each friction shoe 38 affords on its top surface a two-way tapering friction face 96 on which the adjacent bolster wing portion may seat, the taper of the surface 96 being such that each friction shoe is urged into the corner of the adjacent wear plate bearing against said wear plate along vertical friction surfaces arranged approximately at right angles to each other. The top surface 96 of each friction shoe is flat but the abutting face of the V-shaped surface 94 on the bottom of the bolster wing portion is crowned or spherical in form. This crown is formed along radii R, R as illustrated in Figures 9 and 10, said radii being of such length as to afford substantial bearing against the shoes while permitting alignment of the friction surfaces of each shoe against the wear plates on the adjacent column.

It will thus be noted that with our novel arrangement, the bolster end may be inserted at the top of the bolster opening 6, the wing portions 68, 68 at opposite sides thereof being accommodated by the cut away portions of the inboard web of each column as defined by the shoulders at 66, 66, and the bolster may be assembled with or dismantled from the side frame while all of the spring group together with the friction shoes are positioned in their normal operating positions.

Our arrangement of the friction device at each side of the bolster is such as to afford maximum wear surfaces against the wear plates on the inner walls of the adjacent columns, bearing of each shoe taking place along two faces of each friction plate, and the engaging angle of each friction shoe with the adjacent portion of the bolster being tapered in two directions to effectively urge said shoes against the adjacent wear plate.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. In a railway car truck, a side frame having tension and compression members and integral columns defining therewith a bolster opening and spaced window openings, each of said columns having a U-section for the major portion of its length with a transverse web and inboard and outboard walls, and a J-section adjacent the upper end thereof with said inboard wall cored away to accommodate an associated bolster, said tension member having a box-section beneath said bolster opening with a top chord thereof widened and formed with upstanding flanges to define a spring seat extending between the webs of said columns, end and intermediate springs on said seat, a bolster projecting into said bolster opening and directly seated on said intermediate springs, said bolster having wing portions receivable within said columns respectively and seated on respective sets of friction shoes, each set of said shoes being supported on an end spring and each shoe of each set having friction face engagement with a web and a wall of the adjacent column, each of said wing portions having a depth less than the height of said J-section at the top of each column to permit application or removal of said bolster at the top of said bolster opening while said springs and friction shoes remain in normal assembled relationship, the shoes of each set having diagonal frictional engagement with the adjacent wing portion effective to urge said shoes into engagement with the web of the adjacent column and to urge said shoes into opposite directions into engagement with the respective walls of said adjacent column.

2. In a railway car truck, a side frame having tension and compression members and integral columns defining therewith a bolster opening and spaced window openings, each of said columns having a U-section for the major portion of its length with a transverse web and inboard and outboard walls, and a J-section adjacent the upper end thereof with said inboard wall cored away to accommodate an associated bolster, said tension member having a box-section beneath said bolster opening with a top chord thereof widened and formed with upstanding flanges to define a spring seat extending between the webs of said columns, end and intermediate springs on said seat, a set of friction shoes seated on each end spring, a bolster projecting into said bolster opening and directly seated on said intermediate springs, said bolster having wing portions receivable within said columns respectively and seated on respective sets of friction shoes and engaging each shoe along a surface inclined both longitudinally and laterally of said truck, each shoe of each set being urged into friction face engagement with a transverse web and a wall of the adjacent column, each of said wing portions having a depth less than the height of said J-section at the top of each column to permit application or removal of said bolster at the top of said bolster opening while said springs and friction shoes remain in normal assembled relationship, the friction shoes of each set having reversely arranged diagonal friction surfaces engaging the adjacent wing portion whereby said bolster is effective to urge the shoes of each set into opposite directions.

3. In a railway car truck, a side frame having tension and compression members and integral columns defining therewith a bolster opening and spaced window openings, each of said columns having a U-section for the major portion of its length with a transverse web and inboard and outboard walls, and a J-section adjacent the upper end thereof with said inboard wall cored away to accommodate an associated bolster, said tension member having a box-section beneath said bolster opening with a top chord thereof widened and formed with upstanding flanges to define a spring seat extending between the webs of said columns, end and intermediate springs on said seat, a set of friction shoes seated on each end spring, a bolster projecting into said bolster opening and directly seated on said intermediate springs, said bolster having wing portions receivable within said columns respectively and seated on respective sets of friction shoes and engaging each shoe along a surface inclined both longitudinally and laterally of said truck, each shoe of each set being urged into friction face engagement with a web and a wall of the adjacent column, each of said wing portions having a depth less than the height of said J-section at the top of each column to permit application or removal of said bolster at the top of said bolster opening while said springs and friction shoes remain in normal assembled relationship.

4. In a railway car truck, a side frame having tension and compression members and integral columns defining therewith a bolster opening and spaced window openings, each of said columns having a U-section for the major portion of its length with a transverse web and inboard and outboard walls, and a J-section adjacent the upper end thereof with said inboard wall cored away to accommodate an associated bolster, said tension member having a box-section beneath said bolster opening with a top chord thereof widened and formed with upstanding flanges to define a spring seat extending between the webs of said columns, end and intermediate springs on said seat, a set of friction shoes seated on each end spring, a bolster projecting into said bolster opening and directly seated on said intermediate springs, said bolster having wing portions receivable within said columns respectively and seated on respective sets of friction shoes and engaging each shoe along a surface inclined both longitudinally and laterally of said truck, each shoe of each set being urged into friction face engagement with a web and a wall of the adjacent column.

5. In a railway car truck, a truss side frame having a tension member and a compression member merging with integral columns to form therewith a bolster opening and spaced window openings, a spring seat on said tension member below said bolster opening, each of said columns having a transverse web and inboard and outboard walls, said inboard wall being cored away adjacent the top of said bolster opening to accommodate insertion of an associated bolster, springs on said spring seat, sets of friction shoes on certain of said springs at respective sides of said bolster opening, a bolster supported on said springs with lateral portions received between the walls of respective columns, said lateral portions having diagonal face engagement with respective sets of friction shoes and engaging each shoe along a surface inclined both longitudinally and laterally of said truck, each of said friction shoes being urged into vertical friction face engagement with a wall and a web of the adjacent column.

6. In a railway car truck, a truss side frame having tension and compression members and spaced columns defining a bolster opening, each of said columns presenting inboard and outboard bolster guide surfaces, said inboard bolster guide surfaces terminating short of the top of said bolster opening to afford access for an associated bolster, end and intermediate springs on said tension member in said opening, a bolster seated on said intermediate springs with wing portions presenting V-shaped friction surfaces converging toward a vertical plane through the center line of the bolster, and a pair of friction shoes seated on each end spring in engagement respectively with the opposite faces of the adjacent V-shaped surface, the shoes of each pair being urged into frictional engagement with one wall of the adjacent column and each shoe of each pair having frictional engagement with an additional wall diverging from said first-mentioned wall at an angle not less than a right angle.

7. In a railway car truck, a side frame having tension and compression members defining with spaced columns a central bolster opening, end and intermediate springs on said tension member in said opening, a bolster seated on said intermediate springs, V-shaped tapering friction surfaces at opposite sides of said bolster, said surfaces diverging toward said columns and a pair of friction shoes seated on each end spring and in frictional engagement with respective faces of the adjacent bolster friction surface, each of said friction shoes having vertical frictional face engagement with two walls of the adjacent column diverging at an angle not less than ninety degrees, and each pair of friction shoes having spring positioning means confining the adjacent spring therebetween.

8. In a railway car truck, a truss side frame having tension and compression members and spaced columns defining a bolster opening, each of said columns presenting inboard and outboard bolster guide surfaces, said inboard bolster guide surfaces terminating short of the top of said bolster opening to afford access for an associated bolster, end and intermediate springs on said tension member in said opening, a bolster seated on said intermediate springs with wing portions presenting V-shaped friction surfaces diverging toward said columns, and a pair of friction shoes seated on each end spring in engagement respectively with the opposite faces of the adjacent V-shaped surface, each of said friction shoes being urged into engagement with a plurality of angularly arranged vertical faces on the adjacent column.

9. In a railway car truck, a truss side frame having tension and compression members merging with spaced columns to define a bolster opening, a spring group on said tension member in said opening, a bolster on said spring group with lateral portions projecting between walls of respective columns, sets of friction shoes on certain of said springs adjacent respective columns, said friction shoes having diagonal face engagement with the adjacent lateral portions effective to urge each of said friction shoes into engagement with a plurality of walls of the adjacent column, said last-mentioned walls diverging from each other at an angle not less than ninety degrees.

10. In a railway car truck, a side frame having tension and compression members defining with spaced columns a central bolster opening, end and intermediate springs on said tension member in said opening, a bolster seated on said intermediate springs, V-shaped tapering friction surfaces at opposite sides of said bolster, and a pair of friction shoes seated on each end spring in frictional engagement with respective faces of the adjacent bolster friction surface, each of said friction shoes having vertical frictional face engagement with two walls of the adjacent column diverging at an angle not less than ninety degrees and being urged thereagainst by said bolster.

11. In a railway car truck, a side frame having a bolster opening, a spring group on said frame in said opening, a bolster seated on said spring group in interlocking engagement with said side frame, and a pair of friction shoes at each side of said bolster in frictional engagement with said bolster and said side frame, each shoe of each pair having two friction surfaces engaging said side frame and angled with respect to each other at least ninety degrees, and a third friction surface engaging a crowned face on said bolster to permit alignment with respect to said first-mentioned two surfaces and each pair of shoes being seated upon a spring of said group.

12. In a railway car truck, a side frame having a bolster opening, a spring group on said frame in said opening, a bolster seated on said spring group in interlocking engagement with said side frame, and a pair of friction shoes at each side of said bolster in frictional engagement with said bolster and said side frame, each shoe of each pair having two friction surfaces engaging said side frame along walls angled with respect to each other at least ninety degrees, and a third friction surface having diagonal face engagement with said bolster, each pair of friction shoes being supported on a single spring of said group, the engagement of each shoe with said bolster being operative to urge said shoe into engagement with both of the associated side frame surfaces.

13. In a railway car truck, a side frame member, springs supported thereon, a bolster member seated on said springs in interlocking engagement with said side frame member, and pairs of friction shoes at respective sides of said bolster member engaging said side frame member, each shoe of each pair having a plurality of friction surfaces approximately at right angles to each other engaging one of said members, and a friction face diagonally arranged with respect to both of said surfaces engaging the other of said members, each pair of friction shoes having operative engagement with an adjacent spring.

14. In a railway car truck, a side frame having tension and compression members defining with spaced columns a bolster opening, end and intermediate springs on said tension member in said opening, a bolster seated on said intermediate springs, V-shaped tapering friction surfaces at opposite sides of said bolster, and a pair of friction shoes seated on each end spring in frictional engagement with respective faces of the adjacent bolster surface, each of said friction shoes having a self-aligning bearing against the associated bolster face operative to urge said shoe into abutment with diverging walls of the adjacent column.

15. In a bolster, a box-section end portion having top and bottom walls and side webs, wing portions projecting from said side webs, V-shaped converging friction surfaces on the bottoms of said wing portions extending inwardly of said side webs intermediate said top and bottom walls, and shoulders at opposite sides of each wing portion outwardly of said webs for abutment of positioning means on associated friction shoes.

16. In a bolster, a box-section end portion having top and bottom walls and side webs, wing portions projecting from said side webs, and V-shaped friction surfaces on the bottoms of said wing portions extending inwardly of said side webs intermediate said top and bottom walls, said surfaces converging toward a vertical plane through the centerline of the bolster.

17. A friction shoe for a railway car truck having two vertical friction surfaces arranged approximately at right angles to each other and having a third friction surface diagonally positioned with respect to both of said first-mentioned surfaces, and lugs thereon for positioning said shoe with respect to an associated bolster and associated springs.

WALTER H. BASELT.
JOHN E. FLESCH.